United States Patent
Tysver et al.

(10) Patent No.: US 8,348,630 B2
(45) Date of Patent: Jan. 8, 2013

(54) FLOW COMPENSATED PROPORTIONAL BYPASS VALVE COMBINED WITH A CONTROL VALVE

(75) Inventors: John D. Tysver, Rockford, IL (US); Carthel C. Baker, Oregon, IL (US); Joel W. Kleckler, Rockton, IL (US)

(73) Assignee: Woodward, Inc., Fort Collins, CO (US)

( * ) Notice: Subject to any disclaimer, the term of this patent is extended or adjusted under 35 U.S.C. 154(b) by 1121 days.

(21) Appl. No.: 12/193,138

(22) Filed: Aug. 18, 2008

(65) Prior Publication Data

US 2010/0037961 A1  Feb. 18, 2010

(51) Int. Cl.
*F04B 49/00* (2006.01)

(52) U.S. Cl. ........ 417/213; 417/220; 417/300; 417/306; 60/39.281

(58) Field of Classification Search .......... 417/307, 417/213, 220, 300; 60/734, 39.281
See application file for complete search history.

(56) References Cited

U.S. PATENT DOCUMENTS

| | | | |
|---|---|---|---|
| 4,458,713 A * | 7/1984 | Wernberg | 137/115.1 |
| 4,468,927 A * | 9/1984 | Farr | 60/554 |
| 4,490,105 A * | 12/1984 | Hunsberger et al. | 431/65 |
| 5,433,237 A * | 7/1995 | Kao et al. | 137/8 |
| 5,490,379 A * | 2/1996 | Wernberg et al. | 60/39.281 |
| 5,715,674 A * | 2/1998 | Reuter et al. | 60/39.281 |
| 6,412,271 B1 * | 7/2002 | Maker et al. | 60/39.08 |
| 6,922,625 B2 * | 7/2005 | Weir et al. | 701/100 |
| 6,962,485 B2 * | 11/2005 | Bennett et al. | 417/213 |
| 2004/0093151 A1 | 5/2004 | Zagranski et al. | |
| 2005/0072160 A1 * | 4/2005 | Futa et al. | 60/773 |
| 2005/0100447 A1 * | 5/2005 | Desai et al. | 417/220 |
| 2005/0217236 A1 * | 10/2005 | Wernberg et al. | 60/39.281 |
| 2005/0284148 A1 * | 12/2005 | Wernberg et al. | 60/734 |

* cited by examiner

*Primary Examiner* — Devon Kramer
*Assistant Examiner* — Ryan Gatzemeyer
(74) *Attorney, Agent, or Firm* — Reinhart Boerner Van Deuren P.C.

(57) ABSTRACT

A common regulator valve is provided for a variable displacement pump fuel metering scheme in which the common regulator valve both controls working output to a pump actuator to control displacement of the variable displacement pump and also to control bypass of excess fuel flow. The regulator valve also includes a differential piston which generates a compensation force off of the bypass flow in order to compensate for changes in spring force and flow reaction force at different system pressures and operational states. As a result, errors in the metered fuel flow can be either eliminated or substantially reduced.

28 Claims, 5 Drawing Sheets

FLOW COMPENSATED PROPORTIONAL BYPASS VALVE COMBINED WITH A CONTROL VALVE

FIELD OF THE INVENTION

The invention generally relates to regulator valves and more particularly relates to regulator valves and regulator schemes for controlling variable displacement pumps and for bypassing flow, such as in fuel deliver systems for gas turbine engines.

BACKGROUND OF THE INVENTION

In fuel delivery systems for gas turbine engines, it is well known to bypass a certain portion of the pumped flow by using the pressure differential generated across a fuel metering valve. Examples of bypass valves with differential pistons to provide compensating area to adjust for different system pressures are shown, for example, in Wernberg, U.S. Pat. No. 4,458,713 and Kao et al., U.S. Pat. No. 5,433,237, the full disclosures of which are hereby incorporated by reference.

Additionally, the state of the art also includes more recent attempts at providing a variable displacement pump fuel metering scheme which use a proportional and integral control valve to bypass pump flow and regulate pump flow. Examples of these types of systems are shown, for example, in Bennett et al., U.S. Pat. No. 6,962,485 and Reuter et al., U.S. Pat. No. 5,715,674, the disclosures of which are also hereby incorporated by reference.

BRIEF SUMMARY OF THE INVENTION

It has been recognized by the present inventors that the disadvantage of variable displacement pumping schemes such as in the '674 and '485 patents is that at high system pressures, the pressure differential (ΔP) across the bypass valve is different than at low system pressures. The change in system pressures result in a change in flow reaction force for a given valve position and/or a given bypass flow. To accommodate these system pressure differences and their resulting valve differences, the pressure differential (ΔP) across the metering valve must be slightly different. This slight ΔP difference across the main metering valve results in a slight metered flow accuracy error.

The present invention corrects for such inaccuracy by adding a compensating area and an orifice drop at the bypass inlet with a proportional and control valve to both bypass pump flow and regulate pumped flow in the form of an integrated common regulator valve. This reduces or eliminates the ΔP difference at the metering valve resulting in little or no error.

In accordance therewith, one aspect of the present invention is directed toward a fuel supply system. The fuel supply system comprises a variable displacement pump providing a high pressure fuel supply from a fuel sump and a displacement control device controlling the displacement and thereby pump output of the variable displacement pump. A fuel metering valve is fluidically connected to the variable displacement pump for receiving the high pressure fuel supply and metering fuel flow flowing toward a combustion chamber (such as the manifold and nozzles of a gas turbine engine). A regulator valve is provided which includes a valve housing and a valve element movable therein. The regulator valve includes in combination a fuel bypass arranged to bypass a portion of the high pressure fuel supply around the fuel metering valve and a working output acting upon the displacement control device to control displacement and thereby pump output of the variable displacement pump. As a result, movement of the valve elements simultaneously regulates the fuel bypass and the working output. The movable valve element is responsive to pressure differential across the fuel metering valve. However, additionally, a compensator is integrated into the regulator valve that derives a compensation force from fuel flowing through the fuel bypass. As a result, the position of the movable valve element is determined, at least in part, by the compensation force generated by bypass flow and the pressure differential across the fuel metering valve. This compensation force may be used to correct for flow reaction forces and/or spring force variances.

Another aspect of the present invention is directed toward a regulator valve for regulating fluid bypass and control of a variable displacement pump that is controlled by a displacement control device in a fluid system. The regulator valve comprises: a) valve housing having a plurality of ports including a high pressure port adapted to be fluidically connected to the high pressure fluids supply upstream of the fluid metering valve; b) a lower pressure port (e.g. at an intermediate pressure between high and sump pressures) adapted to be fluidically connected to the lower pressure flow downstream of the fluid metering valve; and c) a sump port adapted to be fluidically connected to the sump pressure such as a fuel tank, for example. The valve element is movable in the valve housing which may comprise a single or multiple component parts moving together. The valve element comprises a differential piston with larger and smaller control lands in which one control land is subjected to the high pressure port and the other control land is subjected to the lower pressure port. A fluid bypass extends between the high pressure port and the sump port with the movable valve element regulating fluid flow along the fluid bypass. At least one working output port (e.g. one working output port for a three-way valve and two or more working output ports for a four-way valve) is provided for connection to the displacement control device for control over the variable displacement pump. The valve element regulates fluid flow along at least one working output. Additionally, a compensation port is provided and communicates pressure of the fluid bypass to a compensation chamber acting on a portion of the differential piston.

In accordance with the above aspect, and according to embodiments disclosed herein, the regulator valve may have the larger control land subject to the high pressure port and the smaller control land subject to the lower pressure port with the pressure of the fluid bypass via the compensation port acting upon a portion of the larger control land in opposition to higher pressure. Additionally, the regulator valve may comprise a spring biasing the valve element against the action of the high pressure port on the larger control land. Even more specifically, the valve element may be linearly translatable such as in the form of a spool valve mounted within a cylindrical chamber defined by the valve housing. The cylindrical chamber may include larger and smaller diameter sections to accommodate the differential piston of the valve element with the larger control land sliding in the larger diameter section and the smaller control land sliding in the smaller diameter section. The compensation port communicates with the larger diameter section of the cylindrical chamber of the valve housing.

Yet a further aspect of the present invention is directed toward a method of generating a fuel flow comprising: pumping fuel to generate a pumped fuel flow; metering at least a portion of the pumped fuel flow; bypassing a portion of the pump fuel flow to generate a bypass flow; controlling the pumping with a working output generating from the pump fuel flow; assimilating the bypassing and the controlling into a common valve; generating a compensation force from the bypass flow; and translating the common valve in response to changes in pressure differential across the fuel metering valve and adjusted by the compensation force.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1A:
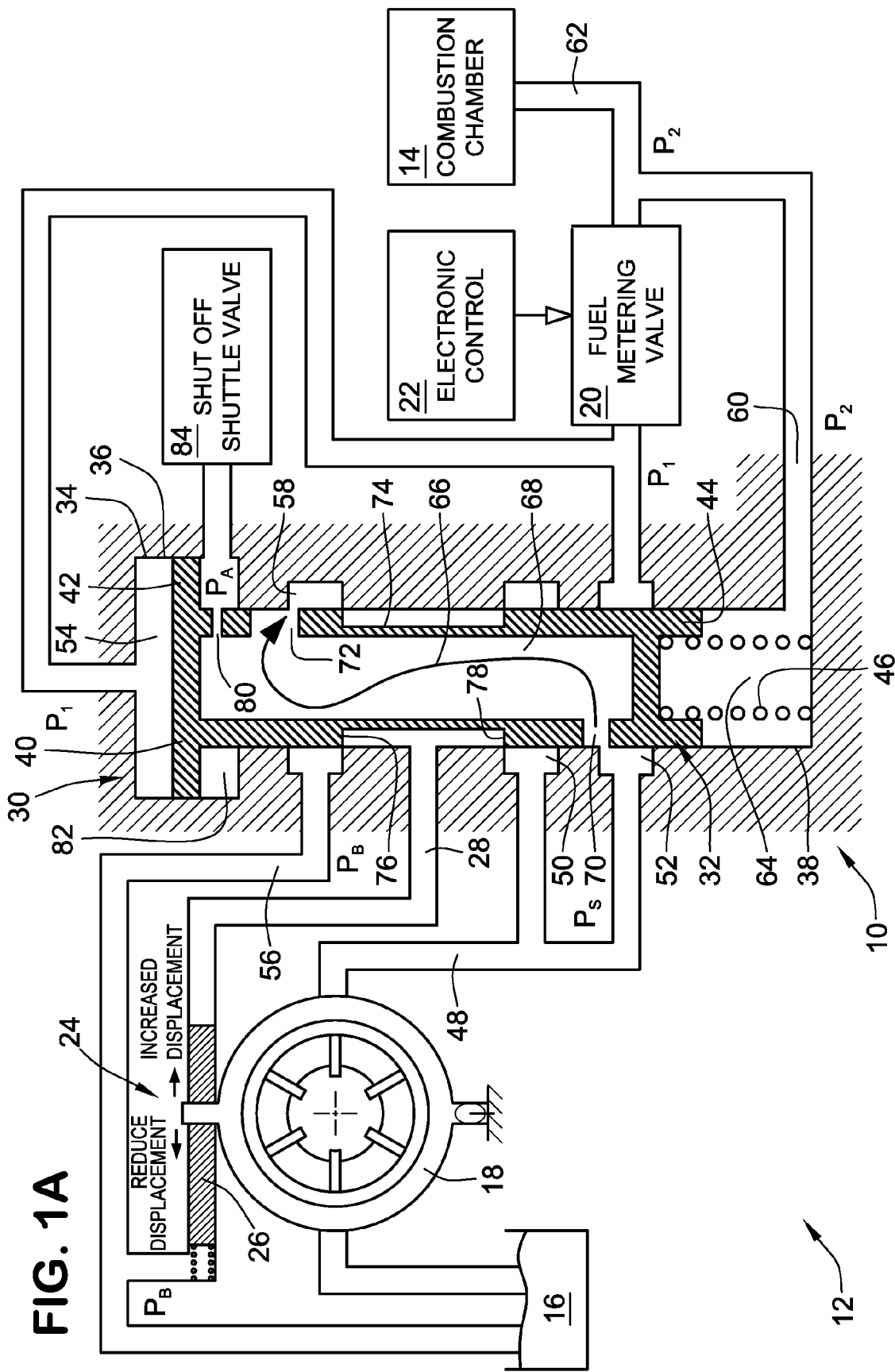
FIG. 1A is a partly schematic and partly cross-sectional view of a new and improved variable displacement pump fluid pressure system having a new and improved regulator valve according to an embodiment of the present invention, shown in a neutral position (e.g. with a portion of the pump flow being bypassed but closing working output flow)
Figure 1B:
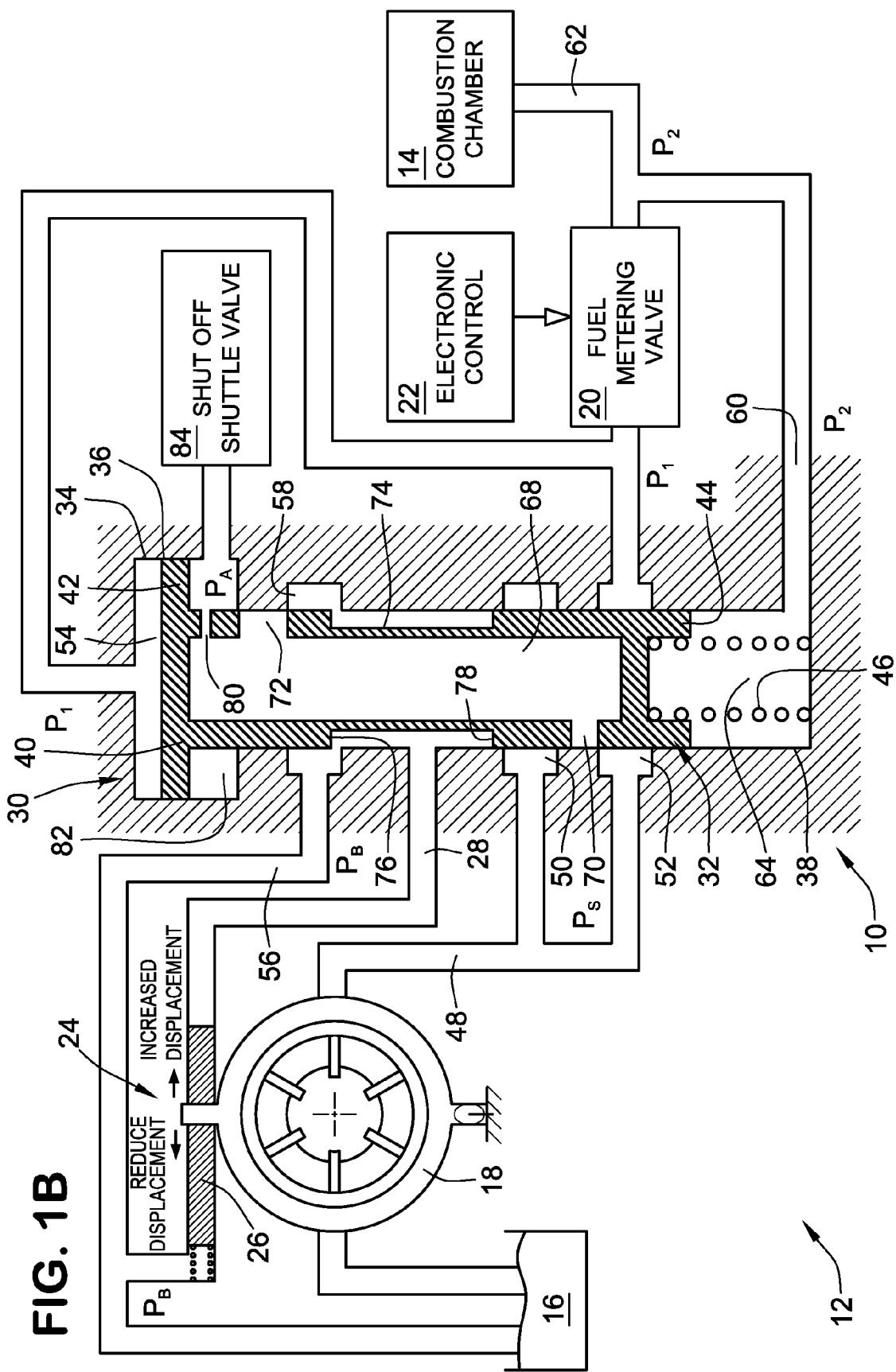
FIG. 1B is the same illustration as FIG. 1A, but with a regulator valve displaced to a fuel demand position.
Figure 1C:
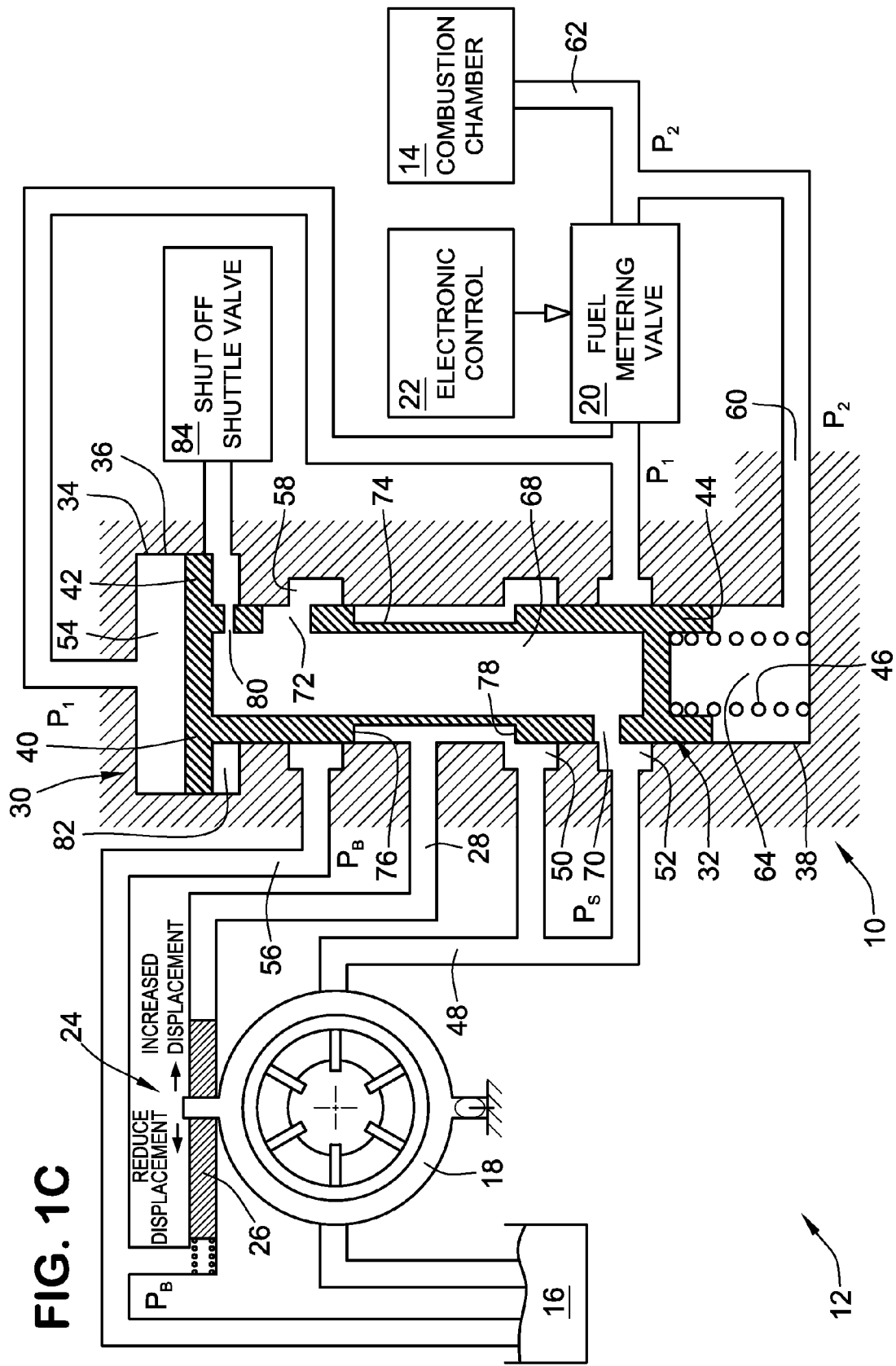
FIG. 1C is also the same view of FIG. 1A, but with the valve translated to a fuel reduction position.

For purposes of illustration, a regulator valve 10, according to a first embodiment of the present invention, is shown in FIGS. 1A-1C. The regulator valve 10 may be incorporated into a variable displacement pumping system 12 for delivering pressurized liquid fuel to nozzles of a combustion chamber 14. For example, this system 12 may be employed in a gas turbine engine that is adapted to drive a rotary compressor. Fuel for the engine is contained at a sump pressure $P_b$ in a fuel tank 16 and upstream fluid lines of the pump. A variable displacement pump 18 is adapted to pressurize and deliver fuel from the fuel tank 16 through various valves to the combustion chamber 14. Between the variable displacement pump 18 and the combustion chamber 14 is a servo-controlled fuel metering valve 20, which may be positioned by appropriate position feedback and an electronic control 22.

The regulator valve 10 is arranged and configured to perform two functions, including: (a) bypassing a certain portion of excess fuel flow back to the fuel tank or otherwise upstream of the variable displacement pump 18 at pressure $P_b$; and (b) controlling a working output to control displacement of the variable displacement pump by way of a displacement control device 24. The displacement control device 24 may take the form of a hydraulic actuator, a switching valve and a selector valve depending upon the variable displacement pumping scheme. In the present embodiment, the displacement control device 24 is shown as a spring loaded actuator 26 in which one side is continuously ported and drained to sump pressure $P_b$ while the other side is subject to higher pressure fluid supply provided by the variable displacement pump 18 as controlled by the regulator valve which is adapted to either exhaust or supply working fluid to the actuator 26. As such, the regulator valve shown in the present embodiment operates as a 3-way valve by alternatively pressurizing or exhausting a working output port 28.

Turning in greater detail to the regulator valve 10, the regulator valve includes a valve housing 30 and a valve element 32 movable therein. The valve element 32 may be made up of one or more component parts assembled together to form an integral body that is moveable together or may also be formed as a unitary body. The valve housing 30 includes a generally cylindrical chamber 34 with larger and smaller cylindrical diameter sections 36, 38. The valve element takes the form of a differential piston 40 to include a larger diameter control land 42 and a smaller diameter control land 44. A coil spring 46 acts on the valve element 32 biasing the valve element 32 in the direction of the larger diameter control land 42 and against the higher pressure acting on the valve.

The valve housing 30 includes various porting arrangements to connect with external fluid structures and internal plumbing to internally port fluid around. In particular, to provide for connection to the high pressure fluid supply from the variable displacement pump 18, the valve housing 30 includes a high pressure port 48 that is internally plumbed to various porting chambers formed in the valve housing 30 to include annuluses 50 and 52 and an end chamber 54 defined by the differential piston 44 and the larger section 36 of the cylindrical chamber 34 of the valve housing 30. Each of these chambers or annuluses 50, 52, 54 are subject to high pressure fluid supply provided by the variable displacement pump 18 that has not been metered by the fuel metering valve 20 and is shown in FIGS. 1A-1C is upstream of the fuel metering valve 20. However, it is recognized that there may be slight pressure differences between the various ports due to restrictions or due to a slight reduction due to a portion of the flow being drawn off for bypassing (e.g. for pressure $P_1$). As a result, slightly different pressures are indicated in the figures as $P_s$ and $P_1$, but again all of which are high pressure and subjected to high pressure fluid supply upstream of the fluid metering valve and downstream of the variable displacement pump.

The valve housing 30 also includes a sump port 56 and an associated annulus 58 which are all in constant fluid communication with the sump port pressure $P_b$ and are operative to drain either bypass fuel and/or working fuel exhausted from the working output port 28 to the sump.

Finally, the valve housing 30 also has a lower pressure port 60 that is of an intermediate pressure between the high pressure 48 and the sump pressure of sump port 56. The lower pressure port 60 is fluidically connected downstream of the fuel metering valve 20 and is subjected to a pressure $P_2$ in FIGS. 1A-1C. The fuel experiences a pressure drop across the fuel metering valve which is typically servo-controlled and thereby lowers the fuel pressure along metered fuel line 62 running to the combustion chamber 14. This lower pressure $P_2$ is communicated to lower pressure chamber 64 at the other end of the valve housing via port 60.

The valve element 32 takes the form of a spool valve in the form of a differential piston 40 with the larger diameter control land 42 and the smaller diameter control land 44. The smaller diameter control land 44 provides a bypass 66 extending from the high pressure port 48 (via annulus 52) to the sump port 56 (via annulus 58). The bypass 66 is provided in part by a hollow interior 68 defined internally within the valve element 32 that facilitates axial flow from one end of the valve toward the other. Additionally, the smaller diameter control land 44 of the valve element 32 includes at least one and preferably multiple bypass inlet ports 70 arranged for communication with the high pressure port 48 (via annulus 52); and at least one and preferably multiple bypass outlet ports 72 arranged to communicate with the sump port 56 (via annulus 58). As a result, the bypass 66 extends through the valve element from the bypass inlet ports 70, axially through the hollow interior 68 and then through the bypass outlet ports 72. Excess fuel flow generated by the pump is bypassed to an upstream location of the pump through the bypass 66 during operation. Preferably, the bypass inlet ports 70 have a smaller flow area than the bypass outlet ports 72 (e.g. due to fewer ports or smaller port circumference) or otherwise form a restriction resulting in a reduced pressure along the bypass pressure $P_A$.

In addition to providing a bypass function, the valve element 32 also facilitates a control of the working output through the working output port 28 by alternatively connecting the working output port 28 to a high pressure port 48 (via annulus 50) or the sump port 56 (via annulus 58). To accomplish this, the valve element includes a cylindrical recess 74 to provide a vent control land 76 and a pressure control land 78 that coacts with the respective annuluses to either vent or pressurize the working output 28. The vent control land 76 provides a control orifice in conjunction with annulus 58 to control venting of working fuel from working output port 28; whereas, the pressure control land 78 provides a restriction control orifice in combination with annulus 50 to regulate pressurization of the working output port 28. As shown in the neutral position in FIG. 1A, the fuel contained in working port 28 is maintained constant without pressurization or venting with the restrictions at the vent control land 76 and pressure control land 78 closed to prevent venting or pressurization of fluid. This maintains a steady state displacement for the variable displacement pump 18.

However, as the valve element 32 translates in response to pressure changes experienced across the fuel metering valve 20, the valve element is translated linearly from the neutral position shown in FIG. 1A to crack open one of the control restriction orifices for either venting working output as shown in FIG. 1B or pressurizing the working output as shown in FIG. 1C; which correspondingly increases displacement of the pump or reduces displacement of the pump, respectively. For example, as shown in FIG. 1B, as the fuel bypass 66 starts to close or closes, the working output port is decreased causing the variable displacement pump 18 to increase displacement and therefore increased pump fuel flow. As such, FIG. 1B is in a fuel demand condition because the pressure differential across the fuel metering valve 20 has dropped which indicates an increase in pumped fuel is demanded. In FIG. 1C, the reverse is true in that the pressure differential across the fuel metering valve 20 has increased pushing the valve element 32 downward thereby causing more fuel to flow along the fuel bypass 66 and also simultaneously causing pressurization of the working output port 28 to reduce pump displacement because reduced fuel output is now demanded.

As the fuel flows along the fuel bypass 66 it experiences a reduction in pressure contained within the hollow interior 68 marked pressure $P_A$. This pressure $P_A$ is communicated through one or more compensation ports 80 formed in the valve element 32 to communicate the pressure $P_A$ to the underside or otherwise in opposition to the higher pressure $P_1$ against a portion of the larger diameter control land 42 of the differential piston 40. As shown, the pressure $P_A$ effectively acts only on the difference in areas between the larger control land 42 and the small diameter control land 44 in an annular compensation chamber 82 that is formed on the outside of the differential piston 40 between the differential piston and the larger section 36 of the cylindrical chamber 34. It should be noted that the pressure $P_A$ contained within the hollow interior 68 acts equally on opposed axial ends of the hollow interior 68 thereby effectively negating any pressure effect within the hollow interior 68.

With the foregoing arrangement, the valve element 32 translates downwardly whenever the pressure $P_1$ in the high pressure line increases or whenever the pressure in $P_2$ in the low pressure line decreases. Such downward translation increases the bypass flow so as to reduce the pressure $P_1$ and maintain a substantially constant pressure drop across the flow metering valve 20. If the pressure $P_1$ in the high pressure line decreases or if the pressure $P_2$ in the low pressure line increases, the valve element shifts upwardly to reduce the bypass flow and thereby increase pressure $P_1$ so as to maintain the pressure drop substantially constant. Simultaneously, the working output is also controlled to increase or decrease displacement of the variable displacement pump 18.

As the valve element shifts downwardly, the force $F_s$ applied to the valve member by the coil spring 46 becomes progressively greater as the compression in the spring increases. As a result, the spring progressively resists upward movement of the valve member to the bypass position as the bypass flow increases. In addition fluid reaction forces $F_r$ increase as the bypass flow increases, and such reaction forces also progressively resist downward movement of the valve element 32. Under such circumstances, and but for the compensation force generated as explained herein, the valve member tends to bypass less flow than is necessary to maintain the desired pressure drop.

In the embodiment, compensation pressure $P_A$ is effective for providing a compensation force to nullify the flow reaction force and spring force variance that is experienced. Specifically, with the foregoing arrangement, the pressure $P_1$ admitted into the high pressure port 48 of the valve housing 30 acts against an effective area $A_1$ defined by the area embraced by the outer periphery of the land 42 and formed in part by the differential piston 40. Thus, a force $P_1 A_1$ tends to shift the valve element 32 downwardly (with the orientation shown in the figures). Downward movement of the valve element 32 is resisted by the pressure $P_2$ admitted into the low pressure port 60 and acting against an area $A_2$ defined by the differential piston 40 of the valve element 32 at the other end. Accordingly, a force $P_2 A_2$ tends to urge the valve member upwardly. That force is augmented by the force $F_s$ of the spring 46 and by the net reaction force $F_r$ of the fluid pressure. In keeping with the invention, a further upward force is exerted on the value member by virtue of the high pressure being transmitted from the bypass 66 to the chamber 82 by way of the ports 80 and acting as a pressure $P_A$ against the lower side of the land 40. The area of the lower side of the land has been designated $A_3$ and, pursuant to the invention, the area $A_3$ is equal to the high pressure area $A_1$ minus the low pressure area $A_2$.

Accordingly, the downward force acting on the valve member 30 and tending to open the bypass port 37 is $P_1 A_1$ while the combined upward force acting on the valve member and tending to close the bypass port is $P_2 A_2 + P_A A_3 + F_s + F_r$. Thus, the force balance on the valve member may be expressed substantially as $$P_1 A_1 = P_2 A_2 + P_A A_3 + F_s + F_r \qquad (1)$$

Thus, the position of the valve element 32 changes as a function of changes in the pressure drop $P_1$-$P_2$ and, assuming that the spring force $F_s$ and the reaction force $F_r$ remain constant throughout the entire range of travel of the valve member, the distance through which the valve member moves varies as a linear function of changes in the pressure drop.

But, the forces $F_s$ and $F_r$ do not remain constant but instead increase as the bypass flow increases and as the valve element 32 shifts downwardly. The pressure regulator valve 10 of the invention, however, compensates for the increase in the forces $F_s$ and $F_r$. As the valve element 32 shifts downwardly to permit bypass flow through the bypass 66, the pressure drop resulting reduces the pressure $P_A$ transmitted to the compensation chamber 82. Referring to equation (1) above, it will be seen that a reduction in the pressure $P_A$ reduces the total upward force acting on the valve element 32 and compensates for the increased upward forces $F_s$ and $F_r$ at FIG. 1C. As the bypass flow increases, the pressure $P_A$ becomes progressively less so as to offset the progressively increasing forces $F_s$ and $F_r$.

Accordingly, the pressure regulator valve 10 of the invention allows the valve element 32 to move to a more open position than would be the case in the absence of the compensating pressure $P_A$. Thus, the pressure drop $P_1$-$P_2$ tends to remain at a more substantially constant value rather than progressively increasing as the bypass flow increases and as the spring 46 and the fluid reaction forces progressively resist upward movement of the valve element 32. As a result, the operation of the regulator valve is more precise over a wider range of bypass flow rates and system pressures. By correlating the areas of the bypass inlet and outlet ports 70, 72 and compensation ports 80 with one another and with the spring 46, the operation of the regulator valve may be optimized for each specific application. The regulator valve 10 also may be used to maintain a substantially constant pressure in fluid pressure systems other than the specific system 12 shown in the drawing.

Additionally, pressure $P_A$ may also be externally controlled by means of a shut-off shuttle valve 84 that can be operative to drive the valve element 62 in either direction within the valve housing 30.

Figure 2:
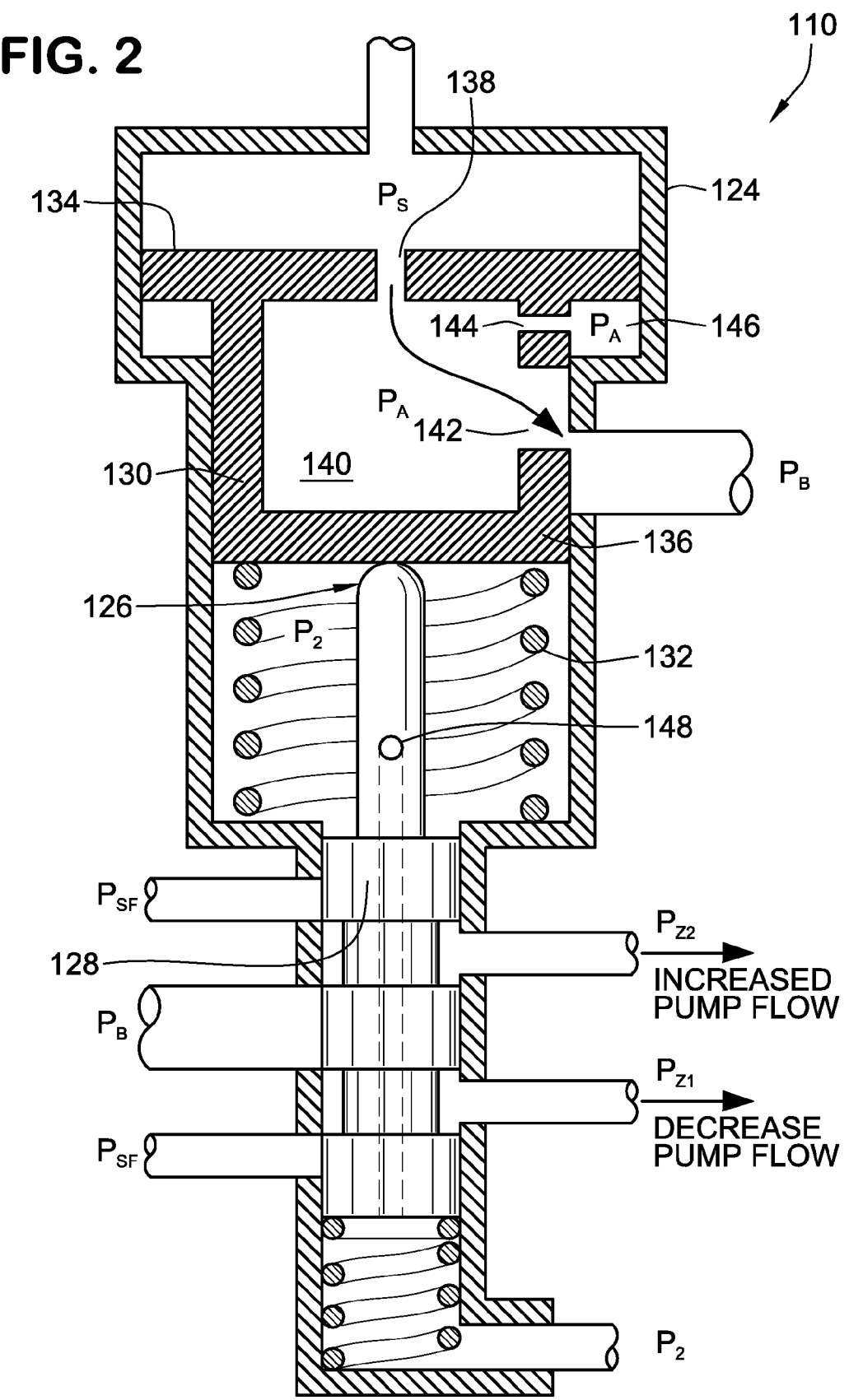
FIG. 2 is a partly schematic and partially cross-sectional view of a regulator valve according to a second embodiment of the present invention.
Figure 3:
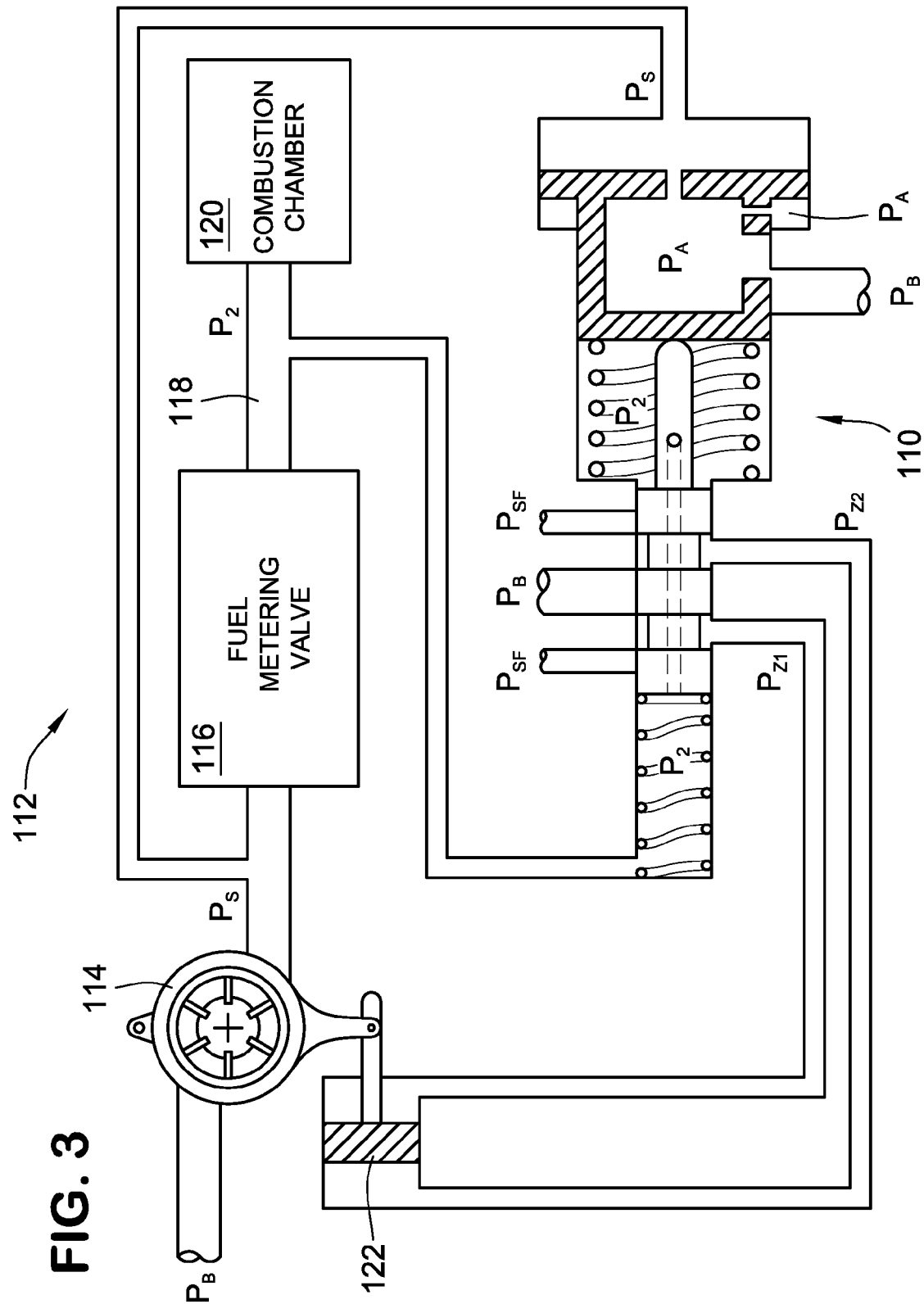
FIG. 3 is a schematic view of a variable displacement pump fluid pressure system incorporating the regulator valve according to the alternative embodiment shown in FIG. 2.

FIG. 2 shows an alternative embodiment of a regulator valve 110 which can be incorporated into a fuel pumping and metering system 112 as shown in FIG. 3. This embodiment also similarly includes a variable displacement pump 114 that provides an output that is metered by a fuel metering valve 116 to provide a metered flow along fuel line 118 to a combustion chamber 120, such as for a gas turbine engine. The fuel metering valve 116 can also be servo-controlled with an appropriate electrical actuation and electrical control as similar to the previous embodiment. The variable displacement pump 114 can be controlled by a suitable actuator 122 which can increase or decrease displacement and therefore output of the variable displacement pump 114. Various pressures are indicated in FIGS. 2 and 3 to include a sump pressure $P_b$ which, as in the previous embodiment, is connected to the fuel tank and a high pressure $P_s$ which is at or near the output pressure of the variable displacement pump 114 and a metered fuel pressure $P_2$ along the metered fuel line 118 leading to the combustion chamber 120. In this embodiment, the regulator valve 110 is arranged generally parallel to the fuel metering valve 116 rather than in series between the variable displacement pump and the fuel metering valve as was the case in the first embodiment. Accordingly, this embodiment shows that alternative arrangements are contemplated.

This embodiment also shows that a common regulator valve 110 can be used for both bypass and working output functions. However, this embodiment shows a different arrangement and configuration of a regulator valve although it also similarly includes a differential piston 130.

Referring to FIG. 2, the regulator valve 110 includes a valve housing 124 and a valve element 126 movable therein. The valve element 126 includes two different portions including a four-way valve spool 128 for alternatively pressurizing and exhausting working output passages $P_{z2}$ and $P_{z1}$ which operate to linearly drive the pump displacement actuator 122 in opposing directions and thereby modified displacement and output of the variable displacement pump 114 accordingly. The valve spool 128 is in continuous contact with a differential piston 130 that is biased upwardly or axially in one direction by a spring 132. The differential piston includes a larger diameter land 134 and a smaller diameter land 136. The differential piston 130 also provides a fuel bypass that extends from a bypass inlet port 138 to an internal chamber 140 to one or more bypass outlet ports 142 that are formed in the differential piston 130. By configuring the bypass inlet port 138 as a restriction with a larger flow area at the bypass outlet ports 142, an intermediate compensation pressure is generated $P_A$. The compensation pressure $P_A$ is also similarly communicated to the outer portion of the larger diameter land 134 by a compensation port 144 communicating with compensation chamber 146. Additionally, pressure $P_2$ is ported in this case through the valves spool 128 via an internal port 148 to act in conjunction with the spring 132 on the smaller diameter land 136. As a result, equation (1) as for the first embodiment also similarly applies and a compensation port is also similarly generated which correspondingly increases and decreases relative to the spring and flow reaction forces to prevent a significant error in the meter flow from being generated. As a result, two different valves are not necessitated and both bypass and working output control functions for control over variable displacement pump output can be controlled with a common regulator valve 110.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel supply system, comprising:
   a variable displacement pump providing a high pressure fuel supply from a fuel sump;
   a displacement control device controlling displacement and thereby pump output of the variable displacement pump;
   a fuel metering valve fluidically connected to the variable displacement pump for receiving the high pressure fuel supply and metering fuel flow flowing toward a combustion chamber;
   a regulator valve including a valve housing and a valve element movable therein, the regulator valve having in combination a fuel bypass arranged within the valve element to bypass a portion of the high pressure fuel supply around the fuel metering valve and a working output acting upon the displacement control device, wherein movement of the valve element simultaneously regulates the fuel bypass and the working output, the moveable valve element responsive to a pressure differential across the fuel metering valve; and
   a compensator integrated into the regulator valve deriving a compensation force from fuel flow through the fuel bypass within the valve element, wherein a position of the moveable valve element is determined, at least in part, by the compensation force and the pressure differential across the fuel metering valve.

2. The fuel supply system of claim 1, wherein the valve element has a neutral position within the valve housing in which the fuel bypass is cracked open a predetermined amount and wherein the working output is closed.

3. The fuel supply system of claim 2, wherein displacement of the valve element from the neutral position to a fuel demand position cracks open the working output to drive the variable displacement pump toward an increased pump output; and wherein displacement of the valve element from the neutral position to a fuel reduction position cracks the working output open to drive the variable displacement pump toward a decreased pump output.

4. The fuel supply system of claim 1, wherein the fuel bypass and the working output are inversely related, wherein when fuel flow through the fuel bypass increases past a set point then the working output directs the pump output to decrease, and wherein when fuel flow through the fuel bypass decreases past the set point then the working output directs the pump output to increase.

5. The fuel supply system of claim 1, wherein the working output acts upon the displacement control device selected from the group consisting of a hydraulic actuator, a switching valve and a selector valve.

6. The fuel supply system of claim 1, wherein the valve element consists of an integral valve body.

7. The fuel supply system of claim 1, wherein the valve element consists of multiple separable valve bodies in engagement with one another.

8. The fuel supply system of claim 1, wherein the regulator valve is arranged in fluid parallel with the fuel metering valve downstream of the variable displacement pump.

9. A fuel supply system, comprising:
   a variable displacement pump providing a high pressure fuel supply from a fuel sump;
   a displacement control device controlling displacement and thereby pump output of the variable displacement pump;
   a fuel metering valve fluidically connected to the variable displacement pump for receiving the high pressure fuel supply and metering fuel flow flowing toward a combustion chamber;
   a regulator valve including a valve housing and a valve element movable therein, the regulator valve having in combination a fuel bypass arranged to bypass a portion of the high pressure fuel supply around the fuel metering valve and a working output acting upon the displacement control device, wherein movement of the valve element simultaneously regulates the fuel bypass and the working output, the moveable valve element responsive to a pressure differential across the fuel metering valve; and
   a compensator integrated into the regulator valve deriving a compensation force from fuel flow through the fuel bypass, wherein a position of the moveable valve element is determined, at least in part, by the compensation force and the pressure differential across the fuel metering valve; and
   wherein the valve element is controlled by control inputs including a higher pressure input connected upstream of the metering valve and a lower pressure input connected downstream of the metering valve, and wherein the valve element comprises a differential piston to provide the compensator including a larger piston land subject to the higher pressure input and a smaller land subject to the lower pressure input, and wherein the compensation force acts on a portion of the larger piston land in opposition to the higher pressure input.

10. The fuel supply system of claim 9, wherein a restriction providing a pressure drop is provided in the regulator valve proximate an inlet of the fuel bypass, wherein fuel in the fuel bypass is at a reduced pressure relative to the high pressure fuel supply.

11. The fuel supply system of claim 10, further comprising a spring biasing the differential piston in opposition to the higher pressure input.

12. A fuel supply system, comprising:
    a variable displacement pump providing a high pressure fuel supply from a fuel sump;
    a displacement control device controlling displacement and thereby pump output of the variable displacement pump;
    a fuel metering valve fluidically connected to the variable displacement pump for receiving the high pressure fuel supply and metering fuel flow flowing toward a combustion chamber;
    a regulator valve including a valve housing and a valve element movable therein, the regulator valve having in combination a fuel bypass arranged to bypass a portion of the high pressure fuel supply around the fuel metering valve and a working output acting upon the displacement control device, wherein movement of the valve element simultaneously regulates the fuel bypass and the working output, the moveable valve element responsive to a pressure differential across the fuel metering valve; and a compensator integrated into the regulator valve deriving a compensation force from fuel flow through the fuel bypass, wherein a position of the moveable valve element is determined, at least in part, by the compensation force and the pressure differential across the fuel metering valve; and wherein the regulator valve is arranged in fluid series with the variable displacement pump and the fuel metering valve, the regulator valve being interposed therebetween, wherein the regulator valve is adapted to bypass fuel prior to fuel metering.

13. A regulator valve for regulating fluid bypass and control of a variable displacement pump controlled by a displacement control device in a fluid system, the variable displacement pump pumping fluid from a sump to a high pressure fluid supply with a metering valve metering fluid flow of the high pressure fluid supply to generate a metered lower pressure flow, the regulator valve comprising:

a valve housing having a plurality of ports including, (a) a high pressure port adapted to be fluidically connected to the high pressure fluid supply upstream of the fluid metering valve; (b) a lower pressure port adapted to be fluidically connected to the lower pressure flow; (c) a sump port adapted to be fluidically connected to the sump;

a valve element movable in the valve housing, the valve element comprising a differential piston with larger and smaller control lands, one control land subject to the high pressure port and the other control land subject to the lower pressure port;

a fluid bypass extending between the high pressure port and the sump port, the valve element regulating fluid flow along the fluid bypass;

at least one working output port adapted for connection to the displacement control device, the valve element regulating fluid flow along the at least one working output; and a compensation port communicating pressure of the fluid bypass to a compensation chamber acting on a portion of the differential piston.

14. The regulator valve of claim 13, wherein the larger control land is subject to the high pressure port and the smaller control land is subject to the lower pressure port, and wherein the pressure of the fluid bypass via the compensation port acts upon a portion of the larger control land, and further comprising a spring biasing the valve element against the action of the high pressure port on the larger control land.

15. The regulator valve of claim 14, wherein the valve element is linearly translatable within a cylindrical chamber defined by valve housing, the cylindrical chamber including larger and smaller diameter sections, the larger control land sliding in the larger diameter section and the smaller control land sliding in the smaller diameter section, the compensation port communicating with the larger diameter section.

16. The regulator valve of claim 15, wherein the valve element defines an internal passageway therethrough to provide the fuel bypass, the compensation port being defined through the valve element member, and wherein the at least one working output port is controlled by at least one variable restriction formed by at least one corresponding control land in cooperation with the valve housing.

17. The regulator valve of claim 13, wherein the regulator valve is a three-way valve having a single working output port, the regulator valve configured to alternatively pressurize and exhaust the single working output port.

18. The regulator valve of claim 13, wherein the regulator valve is a four-way valve, the at least one working output port including a pair of cooperating output ports configured for alternatively pressurizing and exhausting passages for control of the variable displacement pump.

19. The regulator valve of claim 13, wherein the valve element consists of an integral valve body.

20. The regulator valve of claim 13, wherein the valve element consists of multiple separable valve bodies in engagement with one another.

21. The regulator valve of claim 13, wherein the valve element has a neutral position within the valve housing in which the fluid bypass is cracked open a predetermined amount and wherein the at least one working output port is closed; and wherein displacement of the valve element from the neutral position to a fuel demand position couples the at least one working output port to one of the high pressure and sump ports, and wherein displacement of the valve element from the neutral position to a fuel reduction position couples the at least one working output to a different one of the high pressure and sump ports.

22. The regulator valve of claim 21, wherein the bypass and the working output port are inversely related, wherein when fuel flow through the bypass increases past a set point then the working output port is adapted to direct pump output to decrease, and wherein when fuel flow through the bypass decreases past the set point then the working output port is adapted to direct pump output to increase.

23. A method of generating a fuel flow, comprising:
pumping fuel to generate a pumped fuel flow;
metering at least a portion of the pumped fuel flow;
bypassing a portion of the pumped fuel flow to generate a bypass flow;
controlling the pumping with a working output generated from the pumped fuel flow;
assimilating the bypassing and the controlling into a common valve having a valve element;
generating a compensation force from the bypass flow within the valve element; and
translating the common valve in response to changes in pressure differential across the fuel metering valve and adjusted by the compensation force.

24. The method of claim 23, wherein the common valve includes a differential piston, and further comprising biasing the differential piston in an axial direction with a spring.

25. The method of claim 24, further comprising porting pressure of the bypass flow to a compensation chamber acting upon the differential piston.

26. The method of claim 23, wherein said metering is done by a fuel metering valve, further comprising;
maintaining a substantially constant pumping when the common valve is in a neutral position;
reducing the bypassing and increasing the pumping in response to a pressure drop across the fuel metering valve past a preset point; and
increasing the bypass and decreasing the pumping in response to a pressure increase across the fuel metering valve past the preset point.

27. The method of claim 24 further comprising driving an actuator with the working output, wherein the pumping is performed by a variable displacement pump, and setting the displacement of the variable displacement pump with the actuator.

28. A method of generating a fuel flow, comprising:
pumping fuel to generate a pumped fuel flow;
metering at least a portion of the pumped fuel flow;
bypassing a portion of the pumped fuel flow to generate a bypass flow;

controlling the pumping with a working output generated from the pumped fuel flow;

assimilating the bypassing and the controlling into a common valve;

generating a compensation force from the bypass flow; and translating the common valve in response to changes in pressure differential across the fuel metering valve and adjusted by the compensation force;

wherein the common valve includes a differential piston, and further comprising biasing the differential piston in an axial direction with a spring;

porting pressure of the bypass flow to a compensation chamber acting upon the differential piston; and porting the bypass flow through an internally formed passage of the differential piston.

* * * * *